United States Patent Office 3,048,768
Patented Aug. 7, 1962

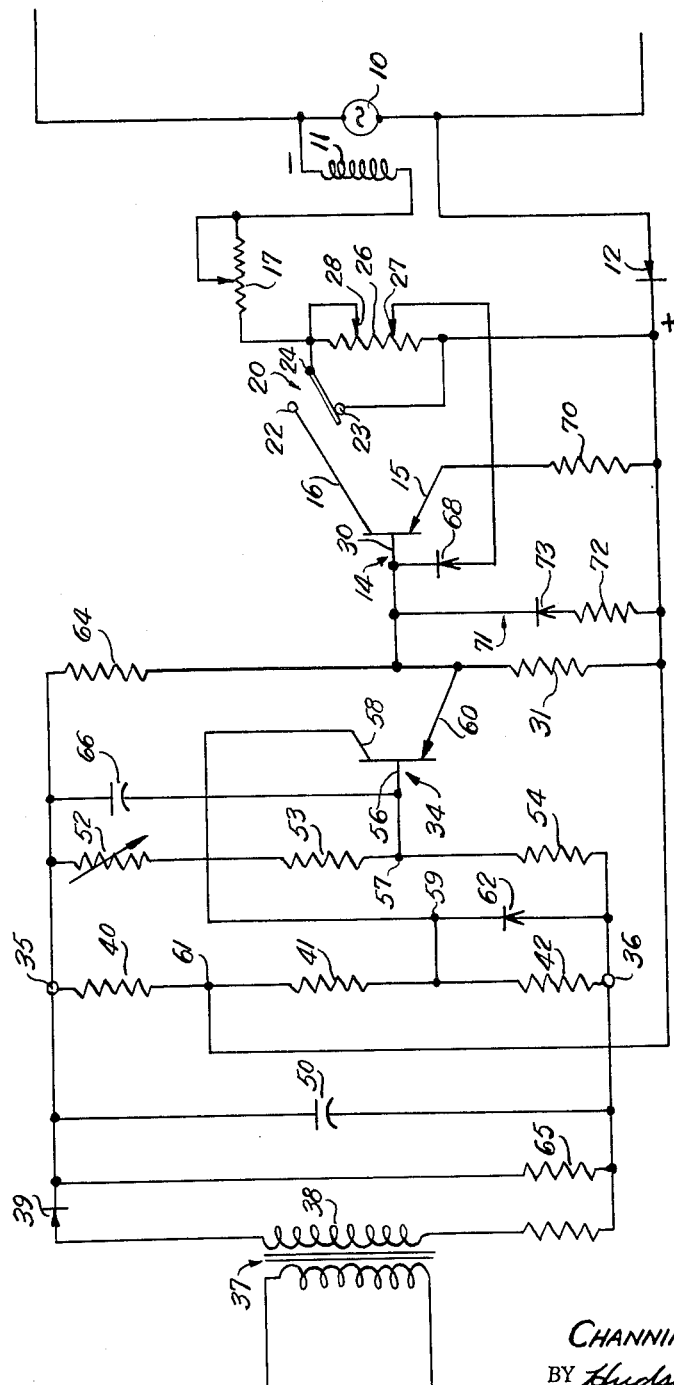

3,048,768
REGULATOR FOR GENERATORS
Channing C. Conger, Olmsted Falls, Ohio, assignor to The Controllix Corporation, Bedford, Ohio, a corporation of Ohio
Filed Mar. 6, 1958, Ser. No. 719,571
10 Claims. (Cl. 322—28)

The present invention relates to regulators for controlling current in response to variations in voltage and, more particularly, to a regulator for regulating the current in the field coil of an electrical generator to control the output voltage at the terminals of the generator.

The principal object of the present invention is to provide a new and improved, relatively inexpensive regulator, which has no moving parts, for maintaining a constant voltage at the output terminals of a generating machine even though the load has large fluctuations or is suddenly removed from the machine.

Another object of the present invention is to provide a new and improved regulator for regulating the current in a field coil of a generating machine to maintain the output voltage of the machine constant and in which a transistor has its output connected in circuit with the field coil to control the current flow therethrough and in which electrical breakdown means is connected between the output circuit and the base of the transistor in a manner which prevents damage to the transistor when voltage surges occur in the field circuit which are of a magnitude to damage the transistor.

Yet another object is to provide a regulator in which an output transistor for regulating the field current of a generating machine is protected by a normally inactive shunt circuit for the input current to the transistor against an overloading output current.

A further object of the present invention is to provide a new and improved regulating circuit for regulating the current in a load in response to changes in a varying voltage and in which a constant voltage device having a predetermined breakdown potential and which becomes nonconductive below a predetermined voltage is utilized in a voltage dividing circuit to which the varying voltage is applied to sense variations in the voltage and for varying the input to a transistor having an output which is to vary inversely with respect to the voltage variations and in which a resistor is connected across the constant voltage device to aid recovery of the regulator when a large voltage drop renders the constant voltage device nonconductive.

A still further object of the present invention is to provide a new and improved regulator for varying the current in a load in accordance with variations in an A.C. voltage applied to the input terminals of the regulator and in which the alternating current voltage is rectified and a condenser across which the voltage sensing circuit of the regulator is connected or charged to the peak value of the rectified voltage and wherein the use of the condenser does not introduce appreciable lag into the response of the regulator.

Further objects and advantages of the present invention will be apparent from the following detailed description of the preferred embodiment thereof made with reference to the accompanying drawing in which the sole figure is a schematic diagram of a regulator for controlling the field current of an alternator in response to variations in voltage at the output terminals of the alternator.

The present invention is susceptible of various constructions and modifications and of use in various applications where it is desirable to regulate current flow in accordance with a varying voltage but is particularly adapted for use in regulating the current flow in the field circuit of a generator or alternator in accordance with voltage fluctuations at the output terminals of the machine so as to maintain a substantially constant voltage at the output terminals.

In accordance with one aspect of the present invention the alternating voltage appearing at the output terminals of an alternator is rectified and a condenser is charged with the rectified voltage to a potential which is preferably the peak potential of the alternating voltage and the sensing circuit of the regulator is connected across the condenser and the output of the sensing circuit is regulated in accordance with the voltage of the condenser and, in addition to the sensing circuit, a loading impedance is also connected across the condenser to cut down lag in the response of the regulator. According to another aspect of the present invention, the recovery time of the generator or alternator is improved when a large drop in voltage occurs which would render the constant voltage electrical device in the sensing circuit thereof nonconductive and cause the field current in the alternator to be a minimum by connecting an impedance across the breakdown device to permit input current to flow in the input of the transistor controlled by the breakdown device when the device is nonconductive.

According to still another feature of the present invention the output circuit of a transistor is connected in series with the field coil of the generator or alternator and the transistor is rendered conductive in response to a current surge in the field circuit to prevent the transistor from being damaged by the current surge. The transistor is rendered conductive in the preferred and illustrated embodiment by connecting a Zener diode in series between the base and the output circuit of the transistor.

Referring to the drawings, a generating machine, or alternator, hereinafter referred to as a generator, is designated generally by the reference numeral 10. The generator 10 includes a field coil 11, also indicated schematically in the drawing, and the current flowing in the field coil determines the voltage at the output terminals of the generator. The field coil 11 may be the field coil of an exciter for producing current for the main field coils of the generator 10 or may be the main field coil in the installations which do not utilize an exciter. Insofar as the present invention is concerned, it is sufficient to know that the current in the coil 11 is to be controlled in accordance with the output voltage of the machine.

As is shown in the drawing, the field coil 11 is energized from the output of the generator 10 rectified by a rectifier 12 to provide a unidirectional current of the proper polarity. The current in the field coil 11 is controlled by a transistor 14 having an emitter 15 and a collector 16 connected in series with the field coil 11 and a field rheostat 17 across the rectified generator output. The transistor 14 is shown as a p-n-p type and the emitter of the transistor 14 is connected to the positive side of the rectified generator output while the collector 16 of the transistor is connected to one side of the field rheostat 17 through a switch 20, the rheostat 17 having its other side connected to one side of the field coil 11 and the other side of the field coil 11 being connected to the negative side of the rectified generator output.

The switch 20 is included in the field circuit between the collector 16 and the field rheostat 17 and includes a contact member 21 movable to selectively engage contacts 22, 23 to connect the contacts to a terminal 24 of the switch. The terminal 24 is connected to the field rheostat 17 and the terminal 22 is connected to the collector 16. Connected between the terminal 24 and the emitter of the transistor 14 is a resistance 26 having two slidable taps 27, 28. The slidable tap 28 varies the amount of resistance across the emitter and collector of transistor 14 and the purpose of the tap 27 will be explained hereinafter. When the contact member 21 is in engagement with the contact 23, the transistor 14 is rendered ineffective to control the current in the field circuit and the resistance 26 is short-circuited by a connection connecting the contact 23 to the positive end of the resistance. When the member 21 is in engagement with the contact 22 the resistance 26 is connected across the emitter-collector electrodes of the transistor and the transistor is connected to control the current flowing in the field coil 11.

The transistor 14 also includes a base 30 and the output voltage of the generator can be varied by applying a signal to the base and emitter of transistor 14 to control the conductivity of the emitter-collector path thereof. When the base is negative with respect to the emitter, the emitter-collector path is rendered conductive by the current flowing in the base-emitter path and the current flow in the field may be increased or decreased by increasing or decreasing the base-emitter current. Minimum field current is obtained when transistor 14 is cut off and the magnitude of the field current is then determined by the field rheostat and the resistance 26.

The input circuit for the transistor 14 includes a resistor 31 connected between the base 30 and the emitter of the transistor 14 and a voltage drop is developed across this resistor to provide an input current in the base-emitter circuit of the transistor 14. The voltage drop across the resistor 31 is developed by connecting the resistor 31 into the output circuit of a transistor 34 having an input signal applied thereto which varies in a manner dependent upon the variations in the voltage at the output terminals of the generator 10.

In the preferred and illustrated embodiment the output voltage of the generator is rectified and the rectified voltage appears across terminals 35, 36 and the input current to the transistor 34 varies inversely with the voltage at terminals 35, 36. The output voltage of the generator 10 is applied to the primary of a transformer 37 having a secondary 38, one side of which is connected to the terminal 35 through a rectifier 39 poled so that the terminal 35 is positive with respect to the terminal 36 and the other side of which is connected to the terminal 36 through a resistance. Also connected across terminals 35, 36 is a condenser 50 which is charged to the peak value of the voltage appearing across the secondary 45.

A first voltage dividing circuit comprised of series connected resistors 40, 41, 42 is connected between the terminals 35, 36 in the order named. A second voltage dividing network comprised of a potentiometer resistance 52 and resistors 53, 54 is connected between the terminals 35, 36 with the elements being connected in series from the terminal 35 to the terminal 36 in the order named.

The transistor 34 has a base terminal 56 connected to a junction 57 between the resistors 53, 54, a collector 58 connected to a junction 59 between the resistors 41, 42 and an emitter 60 connected to a junction 61 between the resistors 40, 41 by a connection including the input resistor 31 of the transistor 14. The output current of the transistor 34 is controlled by the potential difference between the junctions 57, 61 and this potential difference may be adjusted by varying the potentiometer resistance 52 since the junctions 57, 61 are in effect one pair of terminals at the ends of one diagonal of a bridge circuit having the terminals 35, 36 as the other pair at the ends of the other diagonal of the bridge circuit. The resistances between the junction 57 and the terminals 35, 36 constitute two impedance legs of the bridge and the resistances between the junction 61 and the terminals 35, 36 constitute the other two impedance legs of the bridge.

The bridge circuit also includes an electrical breakdown device, a Zener diode 62 in the preferred embodiment. The Zener diode is connected in parallel with the resistor 42 and, when conducting, maintains a constant voltage drop across the resistor 42.

The resistances of the bridge circuit are so related that when the voltage across the terminals 35, 36 is at the magnitude at which it is to be maintained, the Zener diode is conducting and the junction 61 is sufficiently positive with respect to the junction 57 that the transistor 34 is operating on a linear portion of its output vs. input curve.

When the junction 61 is positive with respect to the junction 57, the voltage drop from junction 61 to terminal 36 is greater than the voltage drop from junction 57 to terminal 36 and the junction 61 will remain positive with respect to junction 57 until the voltage across the bridge is increased to where due to the action of the Zener diode 62 the voltage from junction 57 to terminal 36 is greater than the voltage from junction 61 to terminal 36. It will be noted that as long as the junction 61 is positive with respect to the junction 57, the action of the Zener diode 62 when conducting will cause the voltage across the junctions 57, 61 to vary inversely with respect to the voltage across the terminals 35, 36. If it is desired to have the voltage across junctions 57, 61 vary directly with the voltage across terminals 35, 36, the voltage drop between the junction 57 and terminal 36 is made greater than the voltage drop between junction 61 and terminal 36 when the Zener diode is conducting.

It can now be seen that the input to transistor 34, and consequently the output current varies inversely with the voltage across terminals 35, 36. An increase in output current of the transistor 34 causes an increase in the voltage drop across the resistor 31 in a direction which renders the transistor 14 more conductive to increase the current in the field circuit of the generator and conversely a decrease in output current of the transistor 34 effects a decrease in the field current.

The transistor 14 is preferably biased toward a cutoff condition by a biasing voltage developed across the resistance 31. To provide the biasing potential, the base of the transistor 14 is connected to terminal 35 by a resistor 64 having a relatively large resistance. The bias voltage across the resistor 31 opposes the voltage developed by the output current of the transistor 34 and is preferably such that transistor 14 will cut off when the output current in the output circuit of transistor 34 drops to a point which corresponds to a voltage magnitude at the terminals 35, 36 which is just above the voltage to be maintained.

It will be noted that the resistor 42 is not necessary to the operation of the circuit as long as the Zener diode is conducting. If, however, the voltage in the output terminals should drop below the potential necessary to render the Zener diode conducting the current in the output circuit of the transistor 34 would be blocked and also the input current would be substantially zero and, in the illustrated embodiment, this would occur at a time when it would be desirable to have current flowing in the output circuit since the field circuit is actually calling for an increase in current. By connecting the resistor 42 in parallel with the Zener diode 62, input and output current will flow in the input and output circuits of transistor 34 when the Zener diode stops conducting thus aiding recovery when the output voltage of the generator experiences a sudden drop.

It has been found that the response of the regulator is improved considerably if an impedance is connected across the condenser 50. In the illustrated regulator, a resistor 65 is connected across the condenser 50 and corrects lag which exists in the regulator if the resistor 65 is not included.

The response of the regulator to rapid variations in the output voltage may be improved by connecting a condenser 66 between the terminal 35 and the base 56 of the transistor 34. Rapid variations in the voltage at the terminals 35, 36 are integrated by the condenser 66 to improve the response of the system to rapid fluctuations.

One of the problems involved in using transistors to control power circuits is the fact that transistors are not capable of handling large amounts of power and are easily damaged by power surges. This must be taken into consideration when designing a transistor regulator for controlling the current in the field coil of a generator since voltage surges occur when the field current is suddenly diminished. In the illustrated embodiment the transistor is protected by connecting the resistance 26 across the emitter and collector terminals and also by rendering the transistor conductive when a voltage surge occurs in the field circuit. In accordance with the present invention the tap 27 of the resistance 26, which is negative with respect to the emitter 15 during voltage surges, is connected to the positive side, or anode, of an electrical breakdown device, preferably a Zener diode 68, having its other side connected to the base of the transistor 14. When the input current to the transistor is decreased quickly, in response to a voltage rise at terminals 35, 36, to try to cut off the transistor 34, the voltage surge which occurs in the field circuit because of the inductive nature of the circuit causes a high voltage drop across the transistor 14 and the resistance 26. When the voltage drop is sufficiently high the Zener diode breaks down and current flows in the base-emitter circuit to render the collector-emitter path conductive and to protect it against damage. The connection of the Zener diode in the circuit is such that its reverse resistance under normal conditions prevents current flow in the base emitter circuit due to the voltage drop across the portion of the resistance 26 between the tap 27 and the positive end of the resistor.

When an electrical breakdown device is connected in the manner described, the resistance value of resistor 26 may be increased to provide a very low field current when the transistor 34 is shut off. In absence of a device for protecting the transistor the resistance of resistor 26 must be kept sufficiently low in an effort, not always a successful effort, to prevent damage to the transistor by voltage surges in the field circuit.

As described above, the Zener diode 68 protects the transistor 14 against current surges in the field circuit when the transistor 14 is suddenly cut off, as when the load on the generating machine 10 is suddenly reduced or removed. The transistor 14, however, is also subject to damage as the output current thereof reaches a value during its normal regulating action which exceeds the maximum rated value for the output current.

Another feature of the present invention protects the transistor 14 when the input current, and, in turn, the output current approaches a point where the output current will exceed its maximum rated value. To this end an impedance 70 is connected to the emitter 15 of the transistor 14 and is common to the input circuit of the transistor and the output circuit. A shunt circuit 71 is connected to the base 30 of the transistor 14 and across the resistor 70 to the positive side of the resistor 70 and of the field circuit of the generator. The shunt circuit 71 includes an impedance 72 and a rectifying device 73 which is, in the illustrated embodiment, a Zener diode poled so that its forward resistance is presented to current flowing to the base 30, the normal direction of current flow in the shunt circuit 71. While the rectifying device 73 presents its forward resistance to current flowing in the shunt circuit 71, it is a characteristic of such rectifying devices that the rectifying device is nonconductive until a relatively low predetermined voltage, for example one or two volts, are impressed thereacross. In the disclosed circuit the magnitude of the resistor 70 is chosen so that the voltage drop across the shunt circuit 71 effects a breakdown of the rectifying device 73 when the output current of the transistor 14 approaches its maximum safe value. After the rectifying device 73 breaks down a part of the input current is shunted directly to the base 30 without flowing in the base-emitter circuit of the transistor 14 and limits the output current of the transistor. Preferably, the point of breakdown of the rectifying device 73 is correlated so that when the transistor 34 reaches saturation the input current in the base-emitter path of the transistor 14 is at its maximum rated value.

It can now be seen that the present invention provides a new and improved sensing circuit for sensing variations in a unidirectional voltage and for providing a control current which varies inversely in accordance with the variations in the unidirectional voltage. Furthermore, it can be seen that the present invention provides a regulating circuit for maintaining a voltage at a pair of terminals substantially constant by using a transistor to vary the current in an inductive element which controls the magnitude of the unidirectional voltage, the circuit being so constructed and arranged that the transistor is not damaged by voltage surges in the circuit for energizing the inductive element. In addition, when the present invention is utilized to control an A.C. voltage which is rectified and applied to the input terminals of the sensing circuit of the regulator, the rectifying voltage is, in accordance with one aspect of the present invention, utilized to charge a condenser having a loading impedance connected thereacross to correct for lag in the operation of the circuit.

While the preferred embodiment of the present invention has been described in considerable detail, further modifications, constructions and arrangements will occur to those skilled in the art and it is hereby my intention to cover all such modifications, constructions and arrangements which fall within the ability of those skilled in the art and the scope and spirit of the present invention.

Having thus described my invention, what I claim is:

1. In a regulator for regulating current flow in a series circuit including a unidirectional current source and a coil and subject to inductive voltage surges when the current in the series circuit is suddenly diminished, a transistor having a collector-emitter path connected in series with said coil and said source to control the current in said coil in accordance with the conductivity of the collector-emitter path, said transistor further having a base-emitter path the current in which controls the conductivity of the collector-emitter path, means for establishing an input current in said base-emitter path to control the conductivity of the collector-emitter path, an electrical breakdown device having a predetermined breakdown voltage at which it becomes conductive, means connecting said breakdown device between the base of said transistor and a point in said series circuit negative during inductive current surges with respect to the emtter of said transistor, said breakdown device having a breakdown voltage above the maximum voltage drop between said emitter and point in the absence of inductive surges.

2. In a regulator for regulating current flow in a series circuit including a unidirectional current source and a field coil of a generating machine and subject to inductive voltage surges when the current in the series circuit is suddenly diminished, a transistor having a collector and emitter providing a collector-emitter path; means connecting said collector-emitter path connected in series with said coil and said source to control the current in said coil in accordance with the conductivity of the collector-emitter path, said transistor further having a base-emitter path the current in which controls the conductivity of the collector-emitter path, means for establishing an input current in said base-emitter path to control the conductivity of the collector-emitter path, a resistance connected across the collector and emitter of the transistor and an electrical breakdown device having a predetermined breakdown voltage at which it becomes conductive, means connecting said breakdown device between the base of said transistor and a point on said resistance negative with respect to the emitter of said transistor, said breakdown device having a breakdown voltage above the maximum voltage drop between said emitter and point in the absence of inductive surges.

3. In a regulator for regulating current flow in a series circuit including a unidirectional current source and a coil and subject to inductive voltage surges when the current in the series circuit is suddenly diminished, a transistor having a base and collector and emitter providing a base-emitter path and a collector-emitter path, said collector-emitter path being connected in series with said coil and said source to control the current in said coil in accordance with the conductivity of the collector-emitter path and the current in said base-emitter path controlling the conductivity of the collector-emitter path, input circuit means for establishing an input current in said base-emitter path comprising a source of input current and an impedance in series with said emitter, a normally nonconductive shunt circuit connected in shunt with the portion of said input circuit means comprising said base-emitter path and said impedance and including a rectifying device having a relatively low potential above it which becomes conductive, said first impedance being of a magnitude such that the voltage drop across said portion effects a breakdown of said rectifying device only when the output current of said transistor approaches its maximum desired value.

4. In a regulating system, a transistor having a base and collector and emitter providing a collector-emitter path and a base-emitter path, an output circuit comprising said base-emitter path, an input circuit for establishing an input current in said base-emitter path, said circuits including a common impedance connected to said emitter, a shunt circuit connected to said base and across said impedance including a rectifying device normally nonconductive but conductive when the voltage thereacross said shunt circuit reaches a predetermined value, the magnitude of said impedance being such that the voltage across said shunt circuit effects a breakdown of said device when the current in said output circuit approaches a maximum safe value.

5. In a regulator for maintaining a substantially constant voltage at the output terminals of a generator by variably energizing the generator field circuit which includes a field coil and a unidirectional source for energizing the coil, a unidirectional voltage variable with the generator output voltage and having a predetermined voltage magnitude corresponding to the desired output voltage from said generator, a sensing circuit including an impedance bridge having positive and negative input terminals connected to be energized by the unidirectional voltage and having first and second output terminals, a transistor having emitter, collector and base electrodes, said transistor exhibiting a conductive condition between the emitter and collector electrodes for a positive polarity of one of the emitter and base electrodes with respect to the other, said one of said electrodes being connected to said first output terminal, said other of said electrodes being connected to said second output terminal, said bridge being arranged such that when the unidirectional voltage has a magnitude substantially equal to or less than said predetermined magnitude a first voltage is established between said first output terminal and said negative input terminal which is greater than a second voltage established between said second output terminal and said negative input terminal to effect conduction of said transistor, and a constant voltage device connected in a leg of said bridge circuit to be conductive when said unidirectional voltage has substantially said predetermined magnitude, said leg being connected between one input terminal and one output terminal of said bridge and said device being effective when conductive to cause a reduction in the differential between said first and second voltages for decreasing the conduction of the transistor in response to an increase of said unidirectional voltage above said predetermined magnitude, the emitter-collector path of the transistor being connected to control energization of a field coil of a generator to be regulated and said leg of said bridge comprising circuit means including a resistance paralleling said device and a second resistance connecting said device to one of the terminals to which the leg is connected, the collector-emitter circuit of said transistor being connected across said second resistance.

6. In a regulator for variably energizing the field coil of a generating machine in accordance with a unidirectional voltage proportional to the voltage output of the machine to maintain the voltage output substantially constant including a transistor amplifying means having first and second input terminals and output terminals and increasingly conductive between said output terminals when said first input terminal is made increasingly positive with respect to said second input terminal, said transistor amplifying means including a collector-emitter output circuit and said output terminals being included in said output circuit, said output terminals being connected to the field coil to vary the field current in direct relationship to the current in the output circuit of said transistor amplifying means, and said unidirectional voltage having a predetermined magnitude when the machine voltage is at the magnitude at which it is to be maintained, the improvement which comprises a bridge network having first and second input terminals across which said unidirectional voltage is impressed and first and second output terminals each conected to the respective input terminals of the network by an impedance leg to provide a four-terminal bridge network, said impedance legs being so related that when a voltage having said predetermined magnitude is impressed across the input terminals of the bridge network said first output terminal of the bridge network is positive with respect to the other output terminal thereof with the voltage difference between the output terminals being diminishable by lessening the impedance in certain legs of the bridge network, and a constant voltage breakdown device connected into one of said certain legs whereby the voltage difference between the output terminals of the bridge network decreases as the impressed voltage increases from said predetermined magnitude and conducting when a voltage of said predetermined magnitude is applied to the bridge network, and means connecting said first and second input terminals of said transistor respectively to said first and second output terminals of said bridge network, said one of said legs including circuit means comprising a resistance connected in parallel with said device and a second resistance connecting said device to one of the bridge terminals to which the leg is connected, said collector-emitter output circuit being connected across said second resistance.

7. A regulator as defined in claim 5 wherein the transistor is of the P-N-P type having an emitter electrode connected to said first output terminal and a base electrode connected to said second output terminal.

8. A regulator as defined in claim 5 wherein said constant voltage device is connected between said first output terminal and said negative input terminal.

9. A regultor as defined in claim 6 wherein said transistor amplifying means comprises a trasistor having an emitter-collector path connected in series with said coil and a resistance connected across said emitter-collector path.

10. A regulator as defined in claim 9 wherein said transistor includes a base and said regulator further includes an electrical breakdown device rendered conductive at a predetermined potential connected to said base and to a point in said field circuit negative with respect to the emitter of said transistor during current surges and normally preventing current flow from said point to said base through said electrical breakdown device for normal field current.

References Cited in the file of this patent
UNITED STATES PATENTS

| | | |
|---|---|---|
| 2,332,536 | Schlegel | Oct. 26, 1943 |
| 2,335,612 | Reiskind | Nov. 30, 1943 |
| 2,418,114 | Frankel | Apr. 1, 1947 |
| 2,751,545 | Chase | June 19, 1956 |
| 2,751,549 | Chase | June 19, 1956 |
| 2,759,142 | Hamilton | Aug. 14, 1956 |
| 2,809,301 | Short | Oct. 8, 1957 |
| 2,862,175 | Guyton et al. | Nov. 25, 1958 |
| 2,889,512 | Ford et al. | June 2, 1959 |
| 2,892,143 | Sommer | June 23, 1959 |
| 2,897,431 | Wolfendale | July 28, 1959 |